United States Patent
Suemitsu

(10) Patent No.: US 9,203,758 B2
(45) Date of Patent: Dec. 1, 2015

(54) NETWORK SYSTEM, PACKET PROCESSING METHOD AND RECORDING MEDIUM

(75) Inventor: Mariko Suemitsu, Tokyo (JP)

(73) Assignee: NEC Corporation, Tokyo (JP)

( * ) Notice: Subject to any disclaimer, the term of this patent is extended or adjusted under 35 U.S.C. 154(b) by 85 days.

(21) Appl. No.: 14/002,340

(22) PCT Filed: Mar. 1, 2012

(86) PCT No.: PCT/JP2012/055221
§ 371 (c)(1),
(2), (4) Date: Aug. 29, 2013

(87) PCT Pub. No.: WO2012/121098
PCT Pub. Date: Sep. 13, 2012

(65) Prior Publication Data
US 2013/0336327 A1    Dec. 19, 2013

(30) Foreign Application Priority Data

Mar. 4, 2011  (JP) ................................. 2011-048129

(51) Int. Cl.
*H04L 12/801* (2013.01)
*H04L 12/761* (2013.01)
(Continued)

(52) U.S. Cl.
CPC ............ *H04L 47/10* (2013.01); *H04L 12/1886* (2013.01); *H04L 12/462* (2013.01); *H04L 45/16* (2013.01); *H04L 49/35* (2013.01); *H04L 12/4625* (2013.01); *H04L 12/4641* (2013.01)

(58) Field of Classification Search
CPC .............. H04L 12/1886; H04L 12/462; H04L 12/4625; H04L 12/4641; H04L 45/16
See application file for complete search history.

(56) References Cited

U.S. PATENT DOCUMENTS

| 7,382,787 B1 * | 6/2008 | Barnes et al. ................. 370/401 |
| 7,924,837 B1 * | 4/2011 | Shabtay et al. ............... 370/392 |

(Continued)

FOREIGN PATENT DOCUMENTS

| CN | 101616080 A | 12/2009 |
| CN | 101707569 A | 5/2010 |

(Continued)

OTHER PUBLICATIONS

Japanese Office Action dated Jun. 9, 2014 with a partial English translation thereof.

(Continued)

*Primary Examiner* — Khaled Kassim
(74) *Attorney, Agent, or Firm* — McGinn IP Law Group, PLLC

(57) ABSTRACT

In an open flow network system, a packet to be subjected to multicast transmission is transmitted to a plurality of VLANs which are different. Specifically, a packet transfer processing unit determines, when receiving a packet, whether or not the packet is for the multicast transmission. In case of the multicast transmission, whether or not the packet has been completely transmitted to ports specified for destinations is checked. When not having completely transmitted, a packet header of a packet is rewritten, and the written packet is copied and transmitted to a destination port and a network processor (NP). Through the loop-back processing, whether or not the packet received from NP is for the multicast transmission is determined. In case of the multicast transmission, it is checked whether or not the packet has been completely transmitted to the ports specified for destination. When having not been completely transmitted, the packet is rewritten in the packet header and is copied and transmitted to the destination port and the NP. When having been completely transmitted, the packet is discarded and the processing is ended.

9 Claims, 3 Drawing Sheets

(51) Int. Cl.
*H04L 12/931* (2013.01)
*H04L 12/18* (2006.01)
*H04L 12/46* (2006.01)

(56) References Cited

U.S. PATENT DOCUMENTS

| | | |
|---|---|---|
| 2005/0268137 A1 | 12/2005 | Pettey |
| 2006/0114938 A1 | 6/2006 | Kalkunte et al. |
| 2008/0137660 A1 | 6/2008 | Olakangil et al. |
| 2009/0225660 A1* | 9/2009 | Sakurai ...................... 370/241.1 |
| 2009/0304022 A1* | 12/2009 | Yang et al. ................... 370/463 |
| 2010/0020809 A1* | 1/2010 | Jones et al. .............. 370/395.53 |

FOREIGN PATENT DOCUMENTS

| | | |
|---|---|---|
| EP | 1 672 833 A1 | 6/2006 |
| JP | 07-123095 A | 5/1995 |
| JP | 2007-181049 A | 7/2007 |
| JP | 2010-161473 A | 7/2010 |

OTHER PUBLICATIONS

European Search Report dated Aug. 11, 2014.
English translation of PCT/ISA/237 (written opinion of the international searching authority, dated Apr. 30, 2012).
PCT/IB/373 dated Sep. 10, 2013.
International Search Report in PCT/JP2012/55221 dated Apr. 3, 2012 (English Translation Thereof).
"Openflow switch Specification, Version 1.0.0", [online], the Internet (URL: http://www.openflowswitch.org/documents/ openflow-spec-v1.0.0.pdf), Dec. 31, 2009.
Chinese Office Action dated Jul. 31, 2015 with an English translation thereof.

* cited by examiner

Fig. 3

| MATCH CONDITION | ACTION | PRIORITY |
|---|---|---|
| DESTINATION ADDRESS = MULTICAST ADDRESS α | CHANGE TO VID=A OUTPUT TO A PORT | 100 |
| DESTINATION ADDRESS = MULTICAST ADDRESS α | CHANGE TO VID=B OUTPUT TO B PORT | 100 |
| DESTINATION ADDRESS = MULTICAST ADDRESS α | CHANGE TO VID=C OUTPUT TO C PORT | 100 |
| DESTINATION ADDRESS = MULTICAST ADDRESS β | CHANGE TO VID=A OUTPUT TO A PORT | 200 |
| ⋮ | ⋮ | ⋮ |

NETWORK SYSTEM, PACKET PROCESSING METHOD AND RECORDING MEDIUM

TECHNOLOGY FIELD

The present invention relates to a network system, and more particularly to a packet processing method in a network system.

BACKGROUND ART

As one of the control systems for the network system, a CU (C: control plane/U: user plane) separation type network system is proposed in which a node apparatus (user plane) is controlled from an external control unit (control plane).

As an example of the CU separation type network system, an open flow network system using the open flow (Openflow) technique is known which controls switches from a controller to carry out a route control of the network. The details of the open flow technique have been described in Non-Patent Literature 1. It should be noted that the opening flow network system is an example only.

(Explanation of Open Flow Network System)

In the open flow network system, a controller such as an OFC (Openflow Controller) controls the conducts of the switches by operating flow tables of switches such as OFSs (Openflow switches). The controller and the switch are connected with a secure channel.

The switch in the open flow network system forms an open flow network and is an edge switch or a core switch, which is under the control of the controller. A series of processing to the packet from the reception (inflow) of the packet in the edge switch on the input side to the transmission (outflow) from the edge switch on the output side in the open flow network is called a flow.

The packet may be read as a frame. The packet and the frame are different only in data unit of protocol (PDU: Protocol Data Unit). The packet is a PDU of "TCP/IP" (Transmission Control Protocol/Internet Protocol). On the other hand, the frame is a PDU of the "Ethernet (registered trademark)".

The flow table is a table in which a flow entry is registered to define a predetermined operation (action) to be carried out to the packet (communication data) which matches a predetermined match condition (rule). That is, the flow table stores a set of the flow entries.

The rule of the flow entry is defined based on various combinations of all or part of a destination address, a source address, a destination port, and source port, which are contained in the header field of the packet for each protocol hierarchical layer, and is identifiable. It should be noted that it is supposed that the above-mentioned address contains a MAC address (Media Access Control Address) and IP address (Internet Protocol Address). Also, data in the input port (Ingress Port) in addition to the above data is usable for the rule of the flow entry. Also, as the rule of the flow entry, the one which has expressed a part (or all) of a value of the header field of the packet which shows a flow can be set in the formation of a normal expression and wildcard "*" and so on.

The action of the flow entry is an operation such as "output to specific port", "discard", and "rewrite a header". For example, if identification data of the output port (output port number and so on) is shown in the action of the flow entry, the switch outputs the packet to the port corresponding to this. The packet is discarded if the identification data of the output port is not shown. Or, the switch rewrites the header of the packet based on header data if the header data is shown in the action of the flow entry.

The switch in the open flow network system executes the action of the flow entry to the packet group (packets) which match the rule of the flow entry.

(Multicast Transmission in Existing Open Flow Network System)

In the open flow network system, the multicast transmission of the packet is sometimes carried out as in the conventional network system.

The multicast transmission is a technique for transmitting the packet to a plurality of destinations by specifying one destination. By using the multicast transmission, the same data can be transmitted to a plurality of users in the network.

To realize the processing for the multicast transmission by the switch of the open flow network system, the header of the received packet is rewritten and the received packet must be outputted to each destination port.

However, because the switch can execute the conversion action of the packet only once, when multicast transmission can be carried out in the switch, there are constraints that it is possible to transmit to a single VLAN (virtual LAN) but it is not possible to transmit to a plurality of VLANs which are different from each other.

CITATION LIST

[Non-Patent Literature 1] "Openflow switch Specification, Version 1.0.0", [online], the Internet (URL: http://www.openflowswitch.org/documents/openflow-spec-v1.0.0.pdf)

SUMMARY OF THE INVENTION

An object of the present invention is to provide a network system, in which a network processor is installed in a switch, and in which multicast transmission and multiaction can be realized by utilizing a loop-back function.

The network system according to the present invention includes: a packet transfer processing unit configured to process a reception packet based on a flow entry defining a rule and an action to uniformly control packets as a flow; and a loop-back processing unit configured to realize multicast transmission and multiaction in an open flow network by executing loop-back processing to a packet when receiving the packet from the packet transfer processing unit, and transmitting the loop-backed packet to the packet transfer processing unit.

A switch according to the present invention includes: a packet transfer processing section configured to process a reception packet based on a flow entry defining a rule and an action to uniformly control packets as a flow; and a loop-back processing section configured to realize multicast transmission and multiaction in an open flow network by executing loop-back processing to a packet when receiving the packet from the packet transfer processing unit, and transmitting the loop-backed packet to the packet transfer processing unit.

A packet processing method according to the present invention executed by a switch, includes: processing a reception packet based on a flow entry defining a rule and an action to uniformly control the packets as a flow; outputting a copy of the processed packet to an output destination for loop-back processing; receiving a loop-backed packet; and handling the loop-backed packet as the reception packet again. Thus, the packet processing method according to the present invention is executed by the switch in the open flow network. The loop-back processing may be carried out in the switch or in an external device which is possible to communicate or cooperate with the switch.

A program according to the present invention is for making a computer execute the processing of the packet processing method. It should be noted that the program according to the present invention can be stored in a storing device or a recording medium.

Thus, the identical packet can be transmitted for a plurality VLANs which are different from each other in the open flow network system.

BRIEF DESCRIPTION OF THE DRAWINGS

FIG. 3 is a diagram showing a configuration example of a flow table in the present invention.

DESCRIPTION OF EXEMPLARY EMBODIMENTS

The present invention deals with a CU separation type network system. In this case, an open flow network system as one of the CU separation type network systems will be described as an example. However, actually, the present invention is not limited to the open flow network system.

Exemplary Embodiments

Exemplary embodiments of the present invention will be described below with reference to the attached drawings.
(Basic Structure)

Figure 1:
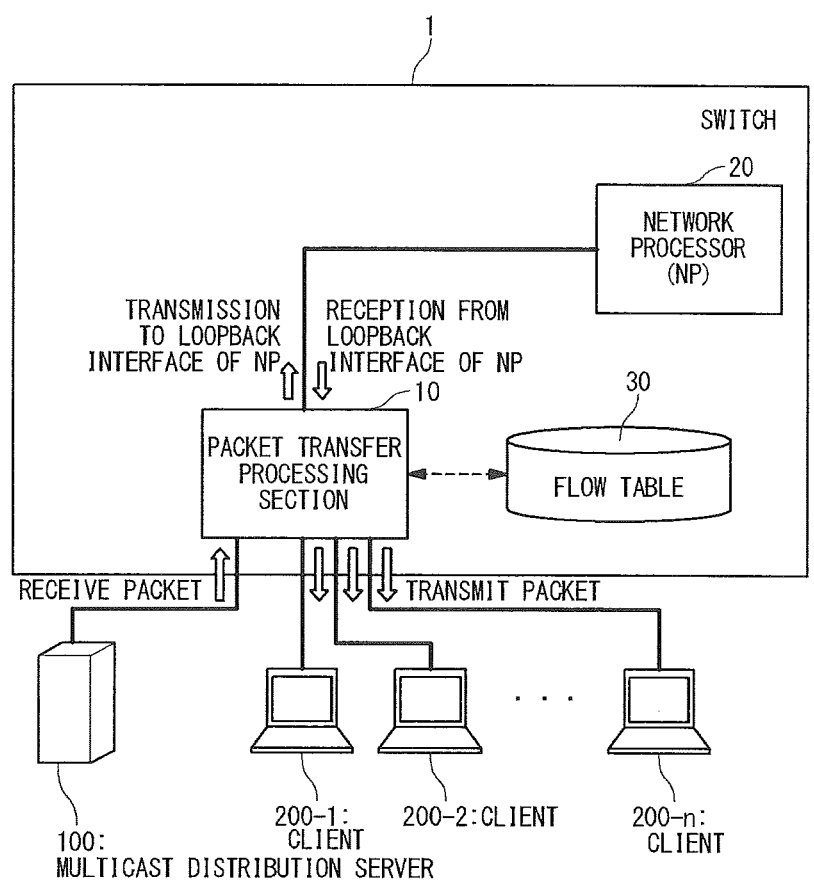
FIG. 1 is a diagram showing a configuration example of a network system according to the present invention.

As shown in FIG. 1, the network system according to the present invention contains a switch 1, multicast distribution server 100 and clients 200 (200-i, i=1 to n: n is the number of clients).

The switch 1 is a switch in the open flow network system. That is, the switch 1 carries out processing on a reception packet according to a flow entry defining a rule and an action to uniformly control packets as a flow. Although not shown, the controller in the open flow network system can set the flow entry to the switch 1.

The multicast distribution server 100 is a server apparatus which transmits multicast packet.

Each of the clients 200 (200-i, i=1 to n) is a terminal which receives multicast packet which is transmitted from the multicast distribution server 100. The clients 200 (200-i, i=1 to n) are grouped according to protocols to be used and each of the groups has an identical destination address. In this case, each of the clients 200 (200-i, i=1 to n) belongs to one of identical VLAN groups.

Therefore, the multicast distribution server 100 can transmit a packet to all of the clients 200 (200-i, i=1 to n) by specifying one destination.
[Switch]

The switch 1 is composed of a packet transfer processing section 10, a network processor (NP) 20 and a flow table 30.

The packet transfer processing section 10 has an open flow interface, receives a packet through the open flow interface and transmits the packet according to the storage contents of the flow table 30. That is, the packet transfer processing section 10 is equivalent to the packet transfer processing unit. The open flow interface is a communication port to transmit and receive the packet based on the open flow protocol to and from a communication device outside the switch.

The network processor (NP) 20 has a loop-back interface and carries out loop-back processing to the packet transferred from the packet transfer processing section 10. That is, the network processor (NP) 20 is equivalent to a loop-back processing unit. The loop-back interface is a communication port to transmit and receive the packet to and from the packet transfer processing section 10. The network processor (NP) 20 replies the packet received through the loop-back interface from the packet transfer processing section 10 to the packet transfer processing section 10 just as it is.

The flow table 30 is a database (DB) which stores a flow table set by the controller of the open flow network system.
(Multicast Distribution Server and Clients)

The description of the multicast distribution server 100 and the clients 200 (200-i, i=1 to n) are omitted because they are the same as in the conventional system.
(Multicast Transmission Processing)

Figure 2:
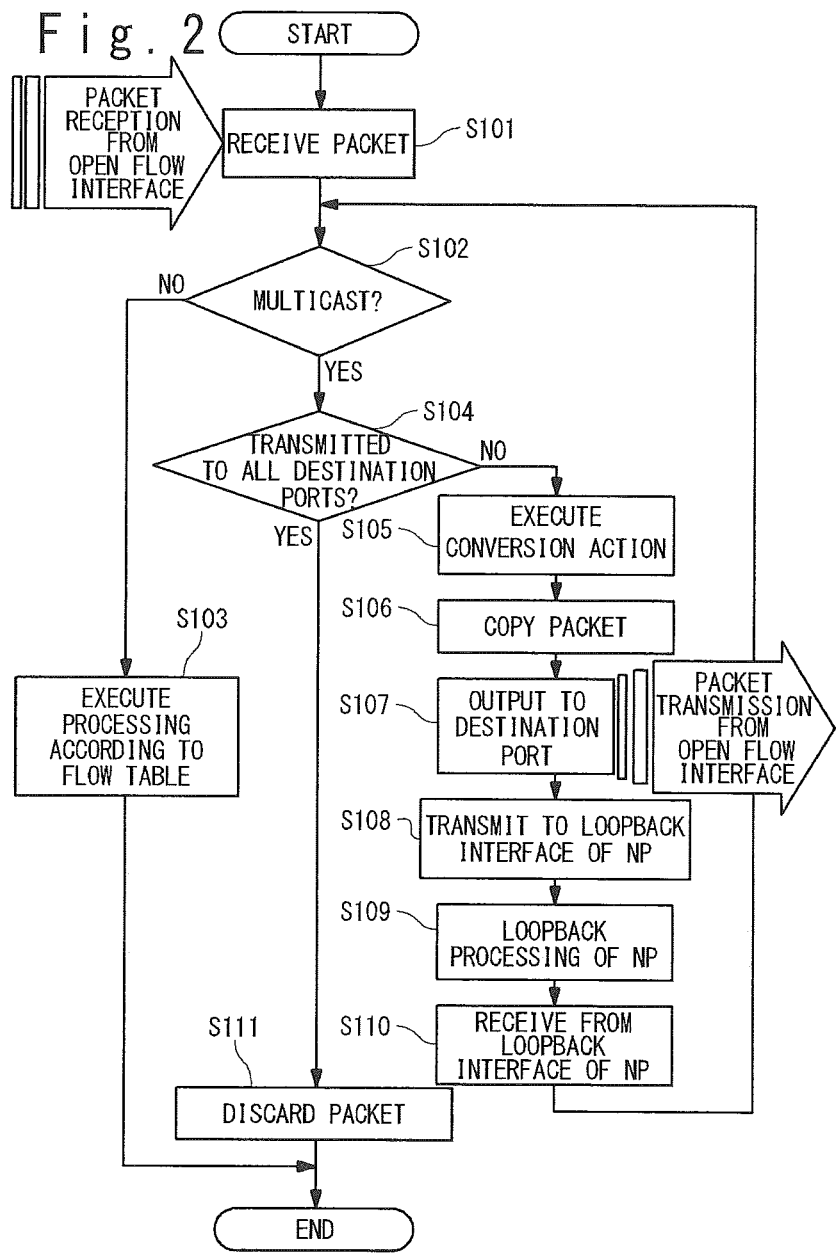
FIG. 2 is a flow chart showing an operation of the multicast transmission in the present invention.

Next, an operation of the multicast transmission processing in the present invention will be described with reference to FIG. 2.
(1) Step S101

The packet transfer processing section 10 of the switch 1 receives a packet through the open flow interface. It should be noted that the flow entry which matches the received packet is supposed to be already set to the flow table 30 of the switch 1.
(2) Step S102

The packet transfer processing section 10 of the switch 1 determines whether or not the received packet is a packet for multicast transmission. The packet transfer processing section 10 of the switch 1 checks whether or not a destination address of the received packet is multicast address, and the packet transfer processing section 10 of the switch 1 determines that the received packet is for the multicast transmission when the destination address is the multicast address.
(3) Step S103

The packet transfer processing section 10 of the switch 1 processes the packet according to the contents of the flow table 30 when the received packet is not for the the multicast transmission. That is, the packet transfer processing section 10 of the switch 1 carries out the packet processing in the usual open flow network system.
(4) Step S104

When the received packet is for the multicast transmission, the packet transfer processing section 10 of the switch 1 checks whether or not all the packets are completed to be transmitted to ports specified for destinations. For example, when the received packet is for the multicast transmission, the packet transfer processing section 10 of the switch 1 generates a list of ports specified for destinations and checks whether or not there is a port not used for the transmission. For the details, the "confirmation procedure of completion of transmission to all the destination ports" is described later.
(5) Step S105

When the packet has not been completely transmitted to all the ports specified for destinations, the packet transfer processing section 10 of the switch 1 carries out a conversion action of the received packet according to an action of the flow entry matching an original received packet, to rewrite a packet header of the received packet. In this case, the header of the packet after the conversion action is supposed to have been converted into "VLAN ID" from the header of the packet before the conversion action. The "VLAN ID" is identification data to uniquely specify a VLAN group.

(6) Step S106

The packet transfer processing section 10 of the switch 1 copies the packet subjected to the conversion action. That is, the packet transfer processing section 10 of the switch 1 copies the packet in which the packet header has been rewritten.

(7) Step S107

The packet transfer processing section 10 of the switch 1 outputs (transmits) the packet subjected to the conversion action to a destination port. In this case, the packet transfer processing section 10 of the switch 1 outputs one of the packets after the copy, to the destination port. For example, after outputting the packet subjected to the conversion action to a destination port written in the head of the list of ports which are specified for destination, the packet transfer processing section 10 of the switch 1 deletes the destination port from the list of ports specified for destinations. Or, the packet transfer processing section 10 of the switch 1 records data indicating that a packet has been transmitted to the destination port, in the list of ports specified for destinations.

(8) Step S108

The packet transfer processing section 10 of the switch 1 transmits the packet subjected to the conversion action, to the loop-back interface of the network processor (NP) 20. For example, the packet transfer processing section 10 of the switch 1 transmits the packet subjected to the conversion action to a loop-back address. In this case, the packet transfer processing section 10 of the switch 1 transmits one of the packets obtained as a result of the copy, to the loop-back interface of the network processor (NP) 20. That is, when the destination address of the received packet is multicast address, the packet transfer processing section 10 of the switch 1 transmits to the loop-back interface of the network processor (NP) 20 in addition to the output port specified in the action.

(9) Step S109

The network processor (NP) 20 returns the packet received through the loop-back interface to the packet transfer processing section 10.

(10) Step S110

The packet transfer processing section 10 of the switch 1 receives the packet from the loop-back interface of the network processor (NP) 20. After that, the packet transfer processing section 10 of the switch 1 determines once again whether or not the received packet is a packet to be subjected to the multicast transmission (returns to step S102). At this time, the packet transfer processing section 10 of the switch 1 may automatically determine that the packet (loop-backed packet) received from the loop-back interface of the network processor (NP) 20 is a packet to be subjected to the multicast transmission.

(11) Step S111

When the packet has been transmitted to all the ports specified for destinations, the packet transfer processing section 10 of the switch 1 discards the packet and the processing is ended.

Thus, the packets to be subjected to the multicast transmission can be transmitted to a plurality of different VLANs.

(Check Procedure of whether the Packet has been Transmitted to all the Destination Ports)

The flow entry as shown in FIG. 3 is supposed to be previously registered on the flow table 30 of the switch 1. Also, it is supposed that the packet transfer processing section 10 of the switch 1 is provided with a counter to check the number of flow entries for transmitted packets.

The packet transfer processing section 10 of the switch 1 searches the flow table 30, and when the flow entries matching the destination address are searched, the packet transfer processing section 10 of the switch 1 determines that the packet has been transmitted to all the destination ports, when the counter value reaches the number of flow entries having the matching condition identical to that of the searched flow entry.

When the packet has not been transmitted to all the destination ports, the packet has been transmitted for the count value of the counter. Therefore, "ULAN ID" of the packet is rewritten based on the action of the flow entry of the flow entries having the matching condition which is located at a position shifted for the counter value of the counter, and the packet is copied and transmitted to the specified port and the loop-back interface of the network processor (NP). Then, the counter is counted up by one.

(Supplement)

It should be noted that in case of not carrying out the multicast transmission but multiaction, the "port specified for destination" is read as the "specified action", and the "execution of conversion action (rewrite of packet header of received packet)" and the "output to destination port" are read as the "execution of specified action" in the above-mentioned explanation. The "execution of conversion action (rewrite of packet header of received packet)" is not necessary. That is, until all the specified actions are executes, loop-back processing is carried out to execute the specified actions one by one.

Other Exemplary Embodiments

The multicast transmission and multiaction can be realized by use of the loop-back interface of the switch 1, instead of the network processor (NP) 20 in FIG. 1. That is, the apparatus which is equivalent to the network processor (NP) 20 may exist outside the switch 1. For example, the network processor (NP) 20 may be a controller in the open flow network system.

Also, the switch 1 may be a switching system configured by combining a plurality of units, in addition to a simple switching unit. That is, the packet transfer processing section 10, the network processor (NP) 20 and the flow table 30 may not always exist in an identical switching unit, and they may be in physically independent units. For example, a switching system obtained by combining the "packet transfer processing unit" which is equivalent to the packet transfer processing section 10 and the "loop-back processing unit" which is equivalent to the network processor (NP) 20 may be used as the switch 1.

Moreover, although the packet is outputted to all the ports specified for destination in the above-mentioned explanation, it is possible to set a port in such a manner that the packet is not outputted to a predetermined port of the ports specified for destination. In this case, if there is the port set at the step S107 of FIG. 2, the copied packet may be discarded without outputting it to the destination port. Thus, it is possible to limit the transmission destination on the switching unit side even in case of the multicast transmission. Also, in the same way, it is possible to limit a specific action even in case of the multiaction.

(Exemplification of the Hardware)

An example of a specific hardware configuration to realize the network system according to the present invention will be described below.

As an example of the switch 1, a network switch, a router, a proxy, a gateway, a firewall, a load balancer (a load distribution apparatus), a band control apparatus (packet shaper), a security monitoring and controlling equipment (SCADA: Supervisory Control And Data Acquisition), a gatekeeper, a base station, an access point (AP), a communication satellite (CS) and a computer having a plurality of communication ports are exemplified. It should be noted that the switch 1 may be expansion cards such as a network card or a virtual switch which is realized by a virtual machine (VM)) which built on a physical machine.

As an example of the multicast distribution server 100 and the clients 200 (200-i, i=1 to n), computers such as a PC (personal computer), an appliance, a workstation, a mainframe, and a supercomputer. It should be noted that the client 200 (200-i, i=1 to n) may be a portable phone, a smart phone, a smart book, an IP telephone, a car navigation system, a mobile-type game machine, a home-use game machine, a mobile-type music player, a handy terminal, a gadget (electronic equipment), an interactive TV, a digital tuner, a digital recorder, information home electronics (information home appliance), an OA (Office Automation) equipment, a storefront terminal and a high level copy machine, a digital signage (electronic signboard) and so on. Also, the client 200 (200-i, i=1 to n) may be installed in movement bodies such as a vehicle a ship, and an aircraft.

Each of the switch 1, the multicast distribution server 100 and the clients 200 (200-i, i=1 to n) are realized by a processor which executes predetermined processing based on the program, a memory which stores the program and various types of data, and an interface which is used for the communication with the network.

As an example of the above-mentioned processor, a CPU (Central Processing Unit), a network processor (NP), a microprocessor, a microcontroller or a semiconductor integrated circuit (LSI: Large Scale Integration) which has a function of exclusive use are exemplified.

As an example of the above-mentioned memory, a semiconductor memory device such as a RAM (Random Access Memory), a ROM (Read Only Memory), EEPROM (Electrically Erasable and Programmable Read Only Memory) and a flash memory, an auxiliary storage such as a HDD (Hard Disk Drive) and an SSD (Solid State Drive), a removable disks such as a DVD (Digital Versatile Disk), a storage media of an SD memory card (Secure Digital memory card) and so on are exemplified. Also, it may be a buffer and a register. Or, it may be a storage unit using DAS (Direct Attached Storage), FC-SAN (Fibre Channel-Storage Area network), NAS (network Attached Storage), IP-SAN (IP-Storage Area network), and so on.

It should be noted that the above-mentioned processor and the above-mentioned memory may be unified. For example, in recent years, a microcomputer is produced as a 1-chip device. Therefore, there is a case that the 1-chip microcomputer which is installed into the computer is composed of a processor and a memory.

As an example of the above-mentioned interface, a substrate (motherboard, and I/O board) and a semiconductor integrated circuit such as a chip, which correspond to the network communication, a network adapter such as a NIC (network Interface Card) and a similar extension card, a communication device such as an antenna, a communication port such as a connection mouth (connector) and so on are exemplified.

Also, as an example of the network, the Internet, a LAN (Local Area The network), a wireless LAN, a WAN (Wide Area The network), a backbone, a CATV line, a fixation telephone network, a mobile phone network, WiMAX (IEEE 802.16a), 3G (3rd Generation), a dedicated line (leased line), IrDA (Infrared Data Association), a Bluetooth (registered trademark), a serial communication line, a data bus and so on are exemplified.

As an example of the packet transfer processing section 10, the above-mentioned interface is exemplified. It should be noted that the packet transfer processing section 10 may be a combination of the above-mentioned processor and the above-mentioned interface.

As an example of the network processor (NP) 20, the above-mentioned processor is exemplified. It should be noted that the network processor (NP) 20 may be a combination of the above-mentioned processor and the above-mentioned interface.

As an example of the flow table 30, the above-mentioned memory is exemplified. It should be noted that the flow table 30 may be a combination of the above-mentioned processor and the above-mentioned memory.

Also, each of the packet transfer processing section 10, the network processor (NP) 20 and the flow table 30 may be computers which are independent from each other.

It should be noted that the component inside the switch 1 may be a module, a component, an exclusive use device and start-up (call) programs for them.

However, actually, the present invention is not limited to these examples.

Summary

As mentioned above, the present invention relates to a technique for realizing multicast transmission and multi-action in the open flow network system.

The present invention is characterized in that a network processor is installed on the switch in the open flow network system, and the multicast transmission and the multiaction are realized by use of the loop-back function.

Also, in the present invention, the loop-back interface of the switch main body can be used as a substitution of the network processor.

In the present invention, when receiving the packet to be subjected to the multicast transmission, a conversion action is first carried out to the received packet, and the packet after the conversion action is copied.

The copied packet is transmitted to the loop-back interface of the network processor and one of destination ports to be used for the multicast transmission, and a response is returned from the loop-back interface of the network processor.

The conversion action is carried out again to the packet received from the loop-back interface of the network processor, and a copy of the packet after the conversion action is generated and transmitted to the destination port and the loop-back interface of the network processor.

By repeating this, the packet having the same contents can be transmitted to a plurality of VLANs which are different from each other.

(Supplement)

Part or whole of the above-mentioned exemplary embodiment can be mentioned in the following supplement. However, actually, the present invention is not limited to the following specific examples.

(Supplemental Note 1)

A switch includes:

a packet transfer processing section configured to process a reception packet according to a flow entry defining a rule and an action to uniformly control packets as a flow; and a loop-back processing section configured to carry out loop-back processing to the received packet, when receiving the packet (the processed packet or the processed copy and so on) from the packet transfer processing section, transmit the packet to the packet transfer processing section, and realize the multicast transmission and multiaction in the open flow network.

(Supplemental Note 2)

The switch according to supplemental note 1, wherein the packet transfer processing section includes:

a functional section configured to transmit the packet to the loop-back processing section when receiving the packet for the multicast transmission; and a functional section configured to receive the packet returned from the loop-back processing section.

(Supplemental Note 3)

The switch according to supplemental note 2, wherein the packet transfer processing section includes:

a functional section configured to check whether or not the received packet is a packet for the multicast transmission;

a functional section configured to execute a conversion action of the received packet according to the flow entry and rewrite a packet header of the reception packet when the reception packet is the packet for the multicast transmission;

a functional section configured to copy the packet in which the packet header is rewritten;

a functional section configured to output one of the packets to one of ports specified as a destination;

a functional part configured to transmit the other of the packets to the loop-back processing section;

a functional section configured to check whether or not the packet has been transmitted to all ports specified for destination when receiving the packet returned from the loop-back processing section;

a functional section configured to discard the packet when having been transmitted to all the ports specified for destination; and a functional section configured to repeat the processing until the packet has been transmitted to all the ports specified for destination, when not having been transmitted to all the ports specified for destination.

(Supplemental Note 4)

The switch according to any of supplemental notes 1 to 3, wherein the packet transfer processing section includes:

a functional section configured to check whether or not the received packet is a packet for the multiaction;

a functional section configured to copy the received packet when the received packet is the packet for the multiaction;

a functional section configured to execute one of actions which are specified according to the flow entry for one of the packets;

a functional section configured to transmit the other of the packets to the loop-back processing section;

a functional section configured to check whether or not specified actions have been all executed when receiving the packet returned from the loop-back processing section;

a functional section configured to discard the packet when all the specified actions have been executed; and a functional section configured to repeat the above-mentioned processing until all the specified actions have been executed when all the specified actions have not been executed.

<Remarks>

As described above, the exemplary embodiments of the present invention have been described in detail, but actually, the present invention is not limited to the above-mentioned exemplary embodiments. A modification in the range which does not deviate from the scope of the present invention is contained in the present invention.

It should be noted that the present application claims a priority based on Japanese Patent Application No. JP 2011-048129. The disclosure thereof is incorporated herein by reference.

The invention claimed is:

1. A network system comprising:
a flow table;
a packet transfer processing unit configured to receive a packet for multicast transmission and process the packet based on the flow table; and
a loop-back processing unit configured, when receiving a packet for multicast transmission from the packet transfer processing unit, to return said packet to said packet transfer processing unit,
the flow table comprising a plurality of flow entries each defining a) a match condition indicating a multicast address as a destination address and b) an action including a destination port, said plurality of flow entries being at least
a first flow entry which defines a first match condition and a first action including a first destination port, and
a second flow entry which defines a second match condition that is identical to the first match condition and a second action including a second destination port that is different from the first destination port,
wherein the transfer processing unit is configured, when a multicast address of a first packet matches a multicast address of the first match condition defined by the first flow entry, i) to rewrite a header of the first packet based on the first action of the first flow entry, ii) to obtain a second packet by copying the rewritten first packet, iii) to transmit the rewritten first packet to the first destination port, and iv) to transmit the second packet to the loop-back processing unit,
the loop-back processing unit is configured to receive the second packet from the transfer processing unit, and to return the second packet to the transfer processing unit, and
the transfer processing unit is further configured, when a multicast address of the second packet from the loop-back processing unit matches a multicast address of the second match condition defined by the second flow entry, v) to rewrite a header of the second packet based on the second action of the second flow entry, and vi) to transmit the rewritten second packet to the second destination port,
wherein the transfer processing unit is configured vii) to obtain a third packet by copying the rewritten second packet, and viii) to transmit the third packet to the loop-back processing unit, the operations v) to viii) being repeated until the transfer processing unit determines that the packets have been transmitted to all destination ports of flow entries indicating match conditions that are identical to each other.

2. The network system according to claim 1, wherein said packet transfer processing unit is provided with a counter to check a number of flow entries with respect to packets which have already been transmitted to the corresponding destination ports,
the transfer processing unit is further configured to check, when receiving a packet returned from the loop-back processing unit, whether or not the packets have been transmitted to all the destination ports of flow entries indicating said identical match conditions,
to determine that the packets have been transmitted to all the destination ports of flow entries indicating said identical match conditions, when a value of the counter reaches a number of all flow entries having said identical matching conditions, and to discard, after the determination, said packet returned from the loop-back processing unit.

3. The network system according to claim 1, wherein said packet transfer processing unit is configured to, comprising:
(a) check whether or not the reception packet is a packet for multiaction;
(b) copy the reception packet when the reception packet is for the multiaction,
(c) execute one of actions specified based on the flow entry to one of the copied packets,
(d) transmit another of the packets to said loop-back processing unit,
(e) check whether or not all the actions have been executed when receiving a packet returned from said loop-back processing unit,
(f) discard the packet when all the specified actions have been executed, and repeat processing of said (a) to said (f) until all the specified actions have been executed, when all the specified actions have not been executed.

4. A packet processing method executed by a switch the switch comprising:
a flow table;
a packet transfer processing unit configured to receive a packet for multicast transmission and process the packet based on the flow table; and
a loop-back processing unit configured, when receiving a packet for multicast transmission from the packet transfer processing unit, to return said packet to the packet transfer processing unit,
the flow table comprising a plurality of flow entries each defining a) a match condition indicating a multicast address as a destination address and b) an action including a destination port, said plurality of flow entries being at least
a first flow entry which defines a first match condition and a first action including a first destination port, and
a second flow entry which defines a second match condition that is identical to the first match condition and a second action including a second destination port that is different from the first destination port, the packet processing method comprising:
at the transfer processing unit
when a multicast address of a first packet matches a multicast address of the first match condition defined by the first flow entry,
i) rewriting a header of the first packet based on the first action of the first flow entry, ii) obtaining a second packet by copying the rewritten first packet, iii) transmitting the rewritten first packet to the first destination port, and iv) transmitting the second packet to the loop-back processing unit,
at the loop-back processing unit receiving the second packet from the transfer processing unit, and returning the second packet to the transfer processing unit, and
at the transfer processing unit
when a multicast address of the second packet from the loop-back processing unit matches a multicast address of the second match condition defined by the second flow entry, v) rewriting a header of the second packet based on the second action of the second flow entry, and vi) transmitting the rewritten second packet to the second destination port, at the transfer processing unit
vii) obtaining a third packet by copying the rewritten second packet, and viii) transmitting the third packet to the loop-back processing unit, the steps v) to viii) being repeated until the transfer processing unit determines that the packets have been transmitted to all destination ports of flow entries indicating match conditions that are identical to each other.

5. The packet processing method according to claim 4, wherein the packet transfer processing unit is provided with a counter to check a number of flow entries with respect to packets which have already been transmitted to the corresponding destination ports, the packet processing method further comprising:
at the transfer processing unit
checking, when receiving a packet returned from the loop-back processing unit, whether or not the packets have been transmitted to all the destination ports of flow entries indicating said identical match conditions,
determining that the packets have been transmitted to all the destination ports of flow entries indicating said identical match conditions, when a value of the counter reaches a number of all flow entries having said identical matching conditions, and
discarding, after the determination, said packet returned from the loop-back processing unit.

6. The packet processing method according to claim 4, further comprising:
(a) checking whether or not the reception packet is for multiaction;
(b) copying the reception packet when the reception packet is for the multiaction;
(c) executing one of actions specified based on the flow entry, to one of the copied packets;
(d) outputting another of the copied packets to an output port for loop-back processing;
(e) checking whether or not the packet has been transmitted to all the ports specified for destinations when receiving the loop-backed packet;
(f) discarding the packet when having been transmitted to all the ports specified for destinations; and
repeating processing of said (a) to said (f) until the packet has been transmitted to all the ports specified for destination when not having transmitted to all the ports specified for destination.

7. A non-transitory recording medium which stores a program for making a switch execute a packet processing method executed by a switch,
the switch comprising:
a flow table;
a packet transfer processing unit configured to receive a packet for multicast transmission and process the packet based on the flow table; and
a loop-back processing unit configured, when receiving a packet for multicast transmission from the packet transfer processing unit, to return said packet to the packet transfer processing unit,
the flow table comprising a plurality of flow entries each defining a) a match condition indicating a multicast address as a destination address and b) an action including a destination port, said plurality of flow entries being at least a first flow entry which defines a first match condition and a first action including a first destination port, and a second flow entry which defines a second match condition that is identical to the first match condition and a second action including a second destination port that is different from the first destination port, the packet processing method comprising:
  at the transfer processing unit
  when a multicast address of a first packet matches a multicast address of the first match condition defined by the first flow entry,
  i) rewriting a header of the first packet based on the first action of the first flow entry, ii) obtaining a second packet by copying the rewritten first packet, iii) transmitting the rewritten first packet to the first destination port, and iv) transmitting the second packet to the loop-back processing unit,
  at the loop-back processing unit receiving the second packet from the transfer processing unit, and returning the second packet to the transfer processing unit, and
  at the transfer processing unit
  when a multicast address of the second packet from the loop-back processing unit matches a multicast address of the second match condition defined by the second flow entry,
  v) rewriting a header of the second packet based on the second action of the second flow entry, and vi) transmitting the rewritten second packet to the second destination port,
  at the transfer processing unit
  vii) obtaining a third packet by copying the rewritten second packet, and viii) transmitting the third packet to the loop-back processing unit, the steps v) to viii) being repeated until the transfer processing unit determines that the packets have been transmitted to all destination ports of flow entries indicating match conditions that are identical to each other.

8. The non-transitory recording medium according to claim 7, wherein the packet transfer processing unit is provided with a counter to check a number of flow entries with respect to packets which have already been transmitted to the corresponding destination ports, and
  at the transfer processing unit
  checking, when receiving a packet returned from the loop-back processing unit, whether or not the packets have been transmitted to all the destination ports of flow entries indicating said identical match conditions,
  determining that the packets have been transmitted to all the destination ports of flow entries indicating said identical match conditions, when a value of the counter reaches a number of all flow entries having said identical matching conditions, and
  discarding, after the determination, said packet returned from the loop-back processing unit.

9. The non-transitory recording medium according to claim 7, wherein said packet processing method further comprises:
  (a) checking whether or not the reception packet is for multiaction;
  (b) copying the reception packet when the reception packet is for the multiaction;
  (c) executing one of actions specified based on the flow entry, to one of the copied packets;
  (d) outputting another of the copied packets to an output port for loop-back processing;
  (e) checking whether or not the packet has been transmitted to all the ports specified for destinations when receiving the loop-backed packet;
  (f) discarding the packet when having been transmitted to all the ports specified for destinations; and
  repeating processing of said (a) to said (f) until the packet has been transmitted to all the ports specified for destination when not having transmitted to all the ports specified for destination.

\* \* \* \* \*